June 22, 1943. W. A. DE VELLIER 2,322,509
SCREW
Filed June 18, 1941 4 Sheets-Sheet 2
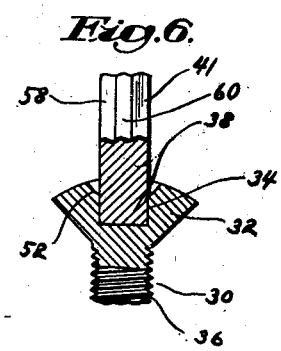
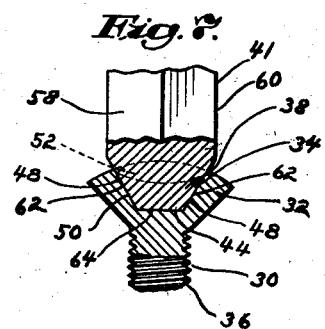
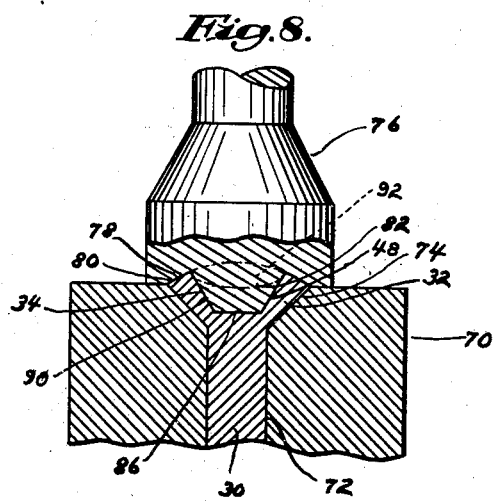
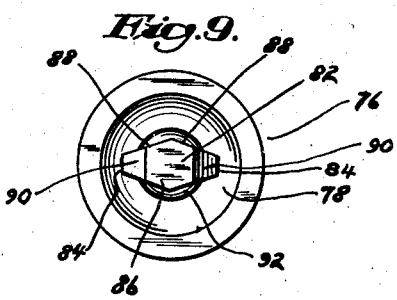
Inventor:
William A. DeVellier,
by Thomas A. Jenks
Attorney June 22, 1943.  W. A. DE VELLIER  2,322,509
SCREW
Filed June 18, 1941  4 Sheets-Sheet 3

Inventor:
William A. DeVellier,
by Thomas A. Jenkes
Attorney

June 22, 1943.  W. A. DE VELLIER  2,322,509
SCREW
Filed June 18, 1941  4 Sheets-Sheet 4

Inventor:
William A. DeVellier,
By Thomas A. Jenckes
Attorney

Patented June 22, 1943

2,322,509

UNITED STATES PATENT OFFICE 2,322,509

SCREW

William A. De Vellier, New York, N. Y.

Application June 18, 1941, Serial No. 398,543

6 Claims. (Cl. 85—45)

My invention relates to improvements in the structure of recesses for receiving the ends of screw drivers for driving purposes in the head of screws, or other threaded members having a turning head having a turning tool receiving recess in the head thereof.

My invention is primarily adapted for use with a power screw driver to easily guide the end of the rotating power screw driver into the recess provided therefor, no matter at what speed the screw driver may be rotating and no matter at what angle it may be inserted within said recess so that the end of the screw driver may readily sink to the bottom of the recess. In the prior art where the ends of irregularly shaped power driven screw drivers have been inserted within irregularly shaped recesses at irregular angles to the axis of the screw, they have tended to gouge out any irregularities that may exist in such recesses and break off any irregularities that there may be in the ends of the screw drivers.

A further object of my invention is to provide a recess which may be readily stamped without tending to wear out the end of the punch die employed. My invention further relates to improvements in the end of such a punch die by providing blunt surfaces thereon so that as such a punch die is imbedded in the end of the screw head for making such a recess, it will not bore out a small hole as such punch dies have in the prior art, but due to its blunt shallow surfaces will tend to heat up the entire head and flow the metal out evenly to form the recess in the head.

It is understood that the average life of a punch die for punching the irregularly shaped recesses in a standard type of Phillips' head of the type shown in Patent No. 2,046,839 for Screws, issued July 7, 1936, is seven to eight thousand impressions. Employing a punch die of the type shown herein making the type of recess shown herein, with a single such punch die, I am enabled to make one hundred thousand such recessed impressions. In addition, as the contact between this particularly shaped punch and the metal of the head is so relatively gentle employing such a shaped recess and such a shaped die, I am enabled to construct the screw heads and screws of hard steel, whereas to make recesses of the Phillips or Frearson type as shown in Frearson Patent No. 308,246 it has been necessary to construct the screw and screw head of a much softer metal.

A further object of my invention is to provide a recess of such a shape that either a specially built screw driver having an end of approximately the shape of the recess shown and claimed in my copending application for Screw drivers and method of their manufacture, Serial No. 398,788, filed June 19, 1941, may be inserted therein or the end of a screw driver of a standard flat shape may be equally well inserted therein, thus providing a single screw which may be employed advantageously for power screw driving and also for the usual type of hand screw driving.

These and such other objects of my invention as may hereinafter appear will be best understood from a description of the accompanying drawings which illustrate various embodiments of screws having recessed heads constructed in accordance with my invention and a punch for making such a head.

In the drawings,

Fig. 1 is a perspective view of a machine screw having a recessed head constructed in accordance with my invention.

Fig. 2 is a plan view thereof.

Fig. 3 is a view of a power screw driver about to be inserted in the head of a machine screw provided with my improved recessed head.

Fig. 4 is a horizontal sectional view taken through the shank of such a screw driver looking down in plan on such a recessed head, illustrating how the end of the screw driver may strike the guide recess at right angles to the diamond shaped recess to be guided therein on further rotation thereof.

Figure 10:
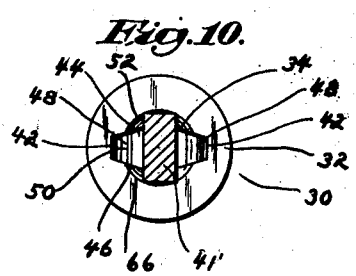
Figure 11:
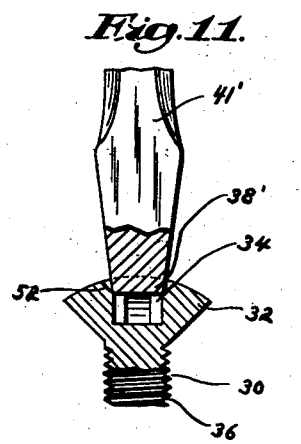
Figure 12:
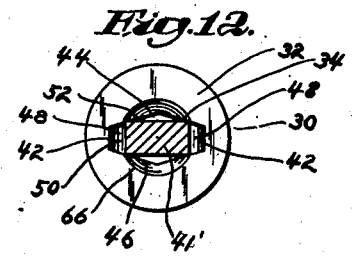
Figure 13:
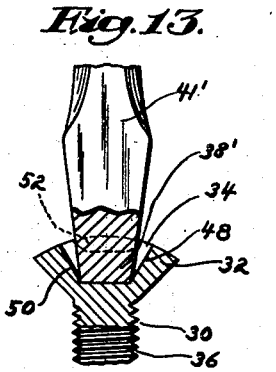

Fig. 4ᵃ is a vertical sectional view showing the end of such a screw driver and recessed screw head in the position they assume in Fig. 4.

Fig. 5 is a horizontal sectional view taken through the lower end of the screw driver showing in plan how it has been inserted within the turning recess provided therefor in the head.

Fig. 6 is a vertical sectional view taken through the center of the head of the screw driver and recessed screw head after the end of the screw driver has been inserted in the recess taken at right angles to the length of the recess.

Fig. 7 is a vertical sectional view of the end of the screw driver and recessed screw head shown in Fig. 6 taken along the length of the recess.

Fig. 8 is a vertical sectional view illustrating the male punch and female header dies I may employ for making my improved recess simultaneously with the usual second heading blow for simultaneously forming the head into the desired shape.

Fig. 9 is a reverse plan view of my improved type of punch die shown in Fig. 8.

and 92 will form the respective recesses 34 and 52 in the screw head in the same operation that said head 32 is shaped in said die 70. It is obvious that the exact shape of the punch may vary in accordance with the respective desired changes in the recess 34.

Figs. 10-14 similarly show how the end 38' of a flat screw driver shank 41' of standard type may be guided into position in the recess 34 by the guide recess 52.

Figure 15:
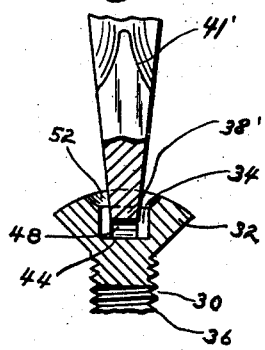
Figure 14:
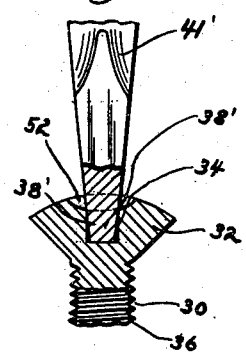
Figure 16:
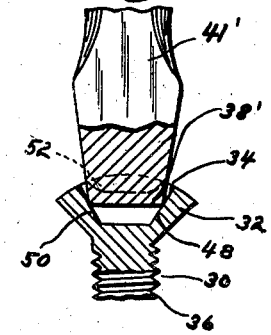
Figure 17:
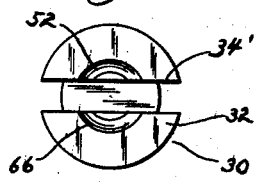
Figure 18:
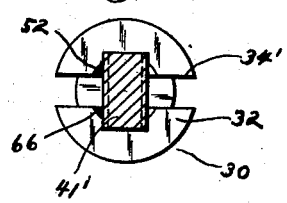

Figs. 15 and 16 illustrate how the end 38' of a flat screw driver shank 41' of greater width than the length of the bottom wall 44 of said recess may still be inserted within the said recess sufficiently for turning purposes.

I have shown in Figs. 17-22 a modified form of recess 34' with which my improved type of guide recess 52 may still be employed. In this instance the recess 34' comprises a standard diametric slot extending all the way across the head of the screw.

Figures 19, 23:
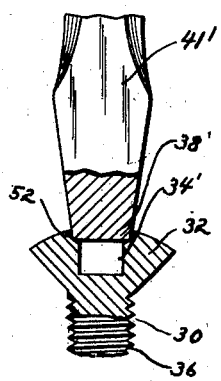
Figure 20:
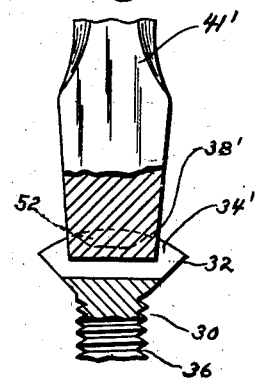
Figure 21:
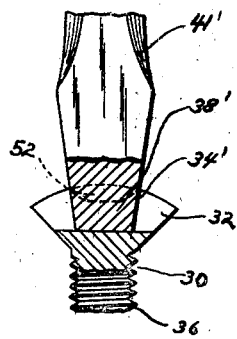
Figure 24:
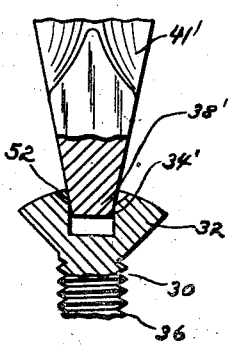
Figure 22:
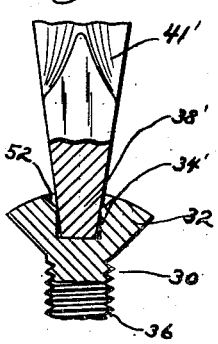

Figs. 18-22 illustrate how the flat end 38' of the shank 41' of a standard screw driver may be guided by said guide recess 52 into said slot 34' and Figs. 23 and 24 illustrate how the end 38' of a screw driver shank of standard flat formation having side walls tapering down to the tip thereof of greater thickness than the base of the slot 38' may be inserted sufficiently within said slot 34' for turning purposes.

It is thus apparent that I have provided a novel type of a guide recess to guide the end of a turning head tool into a suitable recess provided therefor in the turning head of a threaded member with the advantages described above.

It is understood that my invention is not limited to the specific embodiments shown and that various deviations may be made therefrom without departing from the spirit and scope of the appended claims.

What I claim is:

1. A threaded member having a threaded shank and a turning head having a diamond shaped turning tool receiving recess therein centrally thereof truncated at each acute angle end thereof extending within said head in the axial line of said shank having a hexagonal base, straight side walls and end walls tapering obliquely inwardly and downwardly to said base and a shallow partially spherical guide recess concentric with and of much less depth than said diamond shaped recess and of much less diameter than the length of said recess and of greater diameter than the width of said recess.

2. A threaded member having a threaded shank and a turning head having a diamond shaped turning tool receiving recess therein centrally thereof truncated at each acute angle end thereof extending within said head in the axial line of said shank and a shallow partially spherical guide recess concentric with and of much less depth than said diamond shaped recess and of much less diameter than the length of said recess and of greater diameter than the width of said recess.

3. A threaded member having a threaded shank and a turning head having a diamond shaped turning tool receiving recess therein centrally thereof extending within said head in the axial line of said shank and a shallow partially spherical guide recess concentric with and of much less depth than said diamond shaped recess and of much less diameter than the length of said recess and of greater diameter than the width of said recess.

4. A threaded member having a threaded shank and a turning head having a turning tool receiving recess therein centrally thereof extending within said head in the axial line of said shank and a shallow partially spherical guide recess concentric with and of much less depth than said recess and of much less diameter than the length of said recess and of greater diameter than the width of said recess.

5. A threaded member having a threaded shank and a turning head having a slotted diametric turning tool receiving recess therein centrally thereof extending within said head in the axial line of said shank and a shallow partially spherical guide recess concentric with and of much less depth than said slotted diametric recess and of much less diameter than the length of said recess and of greater diameter than the width of said recess.

6. A threaded member having a threaded shank and a turning head having a slotted turning tool receiving recess therein centrally thereof extending within said head in the axial line of said shank and a shallow partially spherical guide recess concentric with and of much less depth than said slotted recess and of much less diameter than the length of said recess and of greater diameter than the length of said recess and of greater diameter than the width of said recess.

WILLIAM A. DE VELLIER.

June 22, 1943.        A. DUFINE        2,322,510
REVERSIBLE GARMENT
Filed July 17, 1941
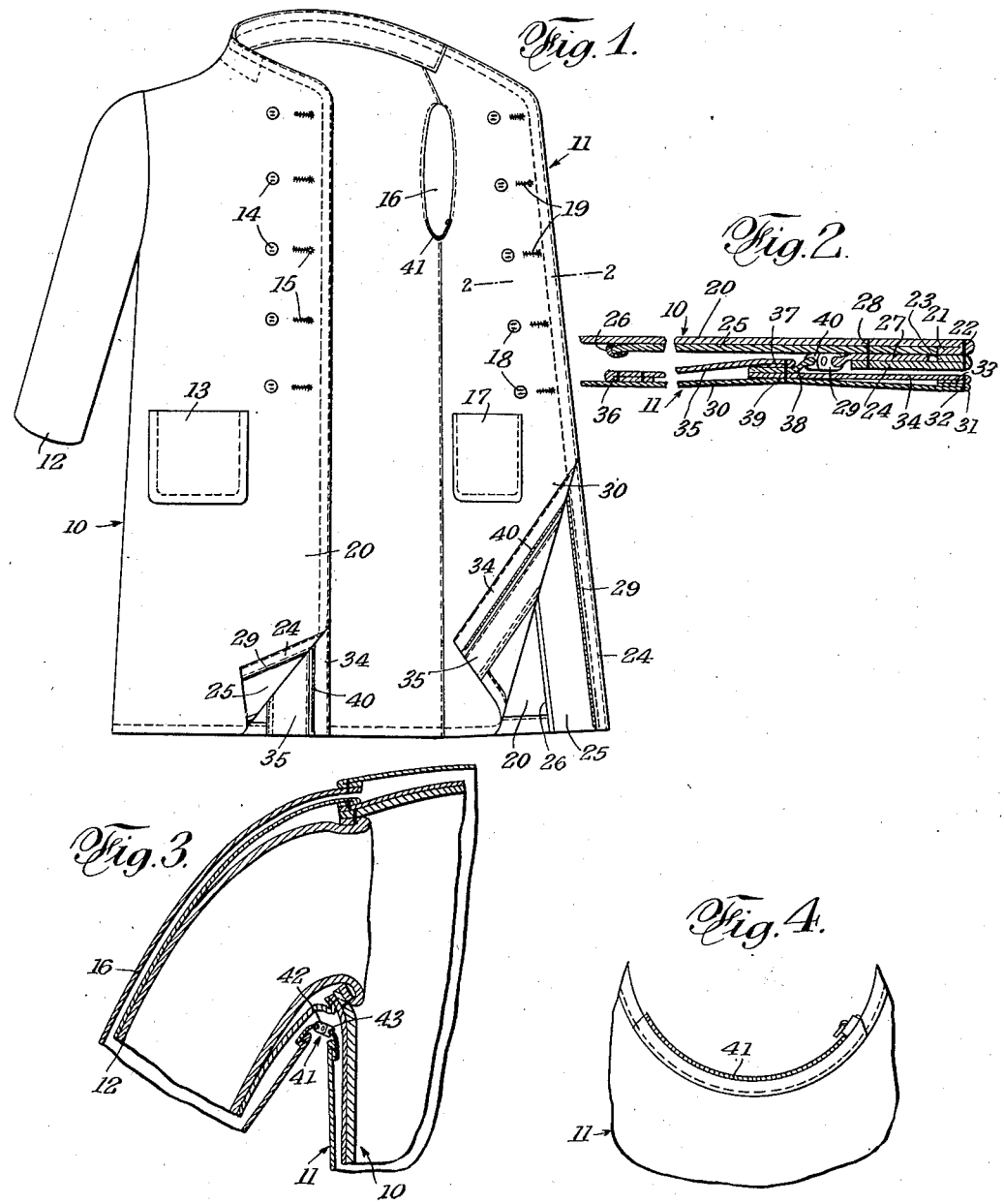
INVENTOR
ABRAHAM DUFINE
BY Percy Freeman
ATTORNEY